(12) United States Patent
Wenzl et al.

(10) Patent No.: US 8,846,244 B2
(45) Date of Patent: Sep. 30, 2014

(54) EXPLOSION PROTECTION FOR STARTER BATTERIES

(75) Inventors: Heinz Wenzl, Osterode (DE); Gerd Niemeyer, Osterode (DE)

(73) Assignee: Froetek Vermoegensverwaltung GmbH, Osterode (DE)

( * ) Notice: Subject to any disclaimer, the term of this patent is extended or adjusted under 35 U.S.C. 154(b) by 515 days.

(21) Appl. No.: 13/061,703

(22) PCT Filed: Apr. 2, 2009

(86) PCT No.: PCT/EP2009/002402
§ 371 (c)(1), (2), (4) Date: Mar. 1, 2011

(87) PCT Pub. No.: WO2010/022803
PCT Pub. Date: Mar. 4, 2010

(65) Prior Publication Data
US 2011/0183187 A1    Jul. 28, 2011

(30) Foreign Application Priority Data
Aug. 30, 2008 (DE) .......... 10 2008 045 200

(51) Int. Cl.
*H01M 2/02* (2006.01)
*H01M 10/42* (2006.01)
*H01M 2/36* (2006.01)
*H01M 2/12* (2006.01)
*H01M 2/04* (2006.01)

(52) U.S. Cl.
CPC ............ *H01M 2/0242* (2013.01); *H01M 2/04* (2013.01); *H01M 2/365* (2013.01); *H01M 2/361* (2013.01); *Y02E 60/12* (2013.01); *H01M 2/1247* (2013.01)
USPC ....................................................... 429/162

(58) Field of Classification Search
USPC ....................................................... 429/162
See application file for complete search history.

(56) References Cited

U.S. PATENT DOCUMENTS

| | | | |
|---|---|---|---|
| 4,338,163 A | 7/1982 | Rittenhouse | 204/2.1 |
| 4,751,155 A | 6/1988 | Binder et al. | 429/53 |
| 5,114,807 A * | 5/1992 | Rowlette | 429/152 |
| 5,352,545 A * | 10/1994 | Furukawa et al. | 429/57 |
| 2002/0155346 A1 * | 10/2002 | Misra et al. | 429/131 |

FOREIGN PATENT DOCUMENTS

| | | |
|---|---|---|
| DE | 42 32 960 A1 | 4/1994 |
| FR | 2 163 446 | 7/1973 |
| JP | 5-217 596 A | 8/1993 |

* cited by examiner

*Primary Examiner* — Karie O'Neill Apicella
(74) *Attorney, Agent, or Firm* — Milton Oliver, Esq.; Oliver Intellectual Property LLC

(57) ABSTRACT

The invention relates to a rechargeable battery in one or more cells and a space disposed above the electrodes and enclosed by the battery cover, wherein at least the space above the battery is partially or completely filled by an open-pore foam and/or a material having a honeycomb structure.

10 Claims, No Drawings

US 8,846,244 B2

EXPLOSION PROTECTION FOR STARTER BATTERIES

CROSS-REFERENCE TO RELATED APPLICATION(S)

This application is a section 371 of PCT/EP2009/02402, filed 2 Apr. 2009, which claims priority from German application DE 10 2008 045 200.9 filed 30 Aug. 2008.

FIELD OF THE INVENTION

The invention relates to a rechargeable battery in one or more cells and a chamber that is situated above the electrodes and the electrolyte level and is closed by the battery cover.

BACKGROUND

A battery may explode for a number of reasons due to the ignition of an explosive atmosphere contained within a cell. Causes for this include both external and internal ignition sources.

In order to absorb an explosion pressure wave produced inside the battery, DE 42 32 960 has disclosed providing the underside of the battery cover with a mat composed of fibrous material.

In addition, U.S. Pat. No. 4,751,154 has disclosed filling the upper, empty battery chamber with a plastic foam whose compressibility is used to absorb the pressure wave of an explosion. It has turned out that these known embodiments do not sufficiently lessen the impact of internal explosions.

SUMMARY OF THE INVENTION

The object of the invention is to improve a rechargeable battery of the type mentioned at the beginning so that internal explosions can be reliably absorbed.

This object is attained, according to the invention, in that at least the chamber above the electrodes is partially or completely filled with an open-pore foam and/or a material with a honeycomb structure.

The open-pore foam or the open honeycomb structure absorbs the pressure wave of an explosion, allowing the pressure to travel into the pores/cells or honeycomb structure so that the exploded gas is absorbed there and the pressure wave is delayed. This significantly reduces the effects of an explosion so that, as a rule, the battery walls and cover are not destroyed.

It is particularly advantageous if a horizontal layer of a material with a honeycomb structure is placed at the very bottom of the chamber above the electrodes and a horizontal layer of open-pore foam is placed above that. As a result, the pressure wave of an explosion travels through a first region with a honeycomb structure that is suitable for absorbing the first, more powerful pressure wave and then travels through a second region of open-cell foam that eliminates the attenuated pressure wave.

According to a preferred embodiment, the foam and/or the material with the honeycomb structure is composed of plastic, glass, or ceramic. It is also advantageous if, in the material with the honeycomb structure, the honeycombs are embodied in the form of small tubes, extending parallel to one another, that are open at both ends. In this case, it is recommended that, in the material with the honeycomb structure, the honeycombs and in particular, the tubes composing the honeycombs, are situated with their longitudinal axes oriented vertically, thus permitting a vertical movement of the electrolyte during charging and discharging and permitting gases produced in the cell to escape from the electrolyte into the open chamber above.

The production is simplified significantly if the foam is an integral component of the cover.

BRIEF FIGURE DESCRIPTION

Exemplary embodiments of the invention will be described in greater detail below. The drawing shows a vertical section through an exemplary embodiment.

DETAILED DESCRIPTION

A rechargeable battery (accumulator) has a housing 1 whose top side is closed by a cover 2 equipped with sealing plugs 3. The housing 1 includes a plurality of cells 4 situated next to one another, which are separated from one another by cell partitions 5. An air-filled chamber 6 is situated between the upper ends of the cells 4 and the cover 2.

When a battery of this kind is being charged, the cells 4 produce gases which, in batteries with aqueous electrolyte, are chiefly composed of hydrogen and oxygen, and therefore constitute a potentially explosive electrolytic gas that can ignite for a wide variety of reasons.

In order to absorb the pressure wave of an electrolytic gas explosion, in a first exemplary embodiment, not shown, the chamber 6 is filled with an open-pore foam 7 or with a material 8 with an open honeycomb structure. When selecting a material with a honeycomb structure, it should preferably be composed of small, densely arranged, vertical, straight tubes that are round or polygonal in cross-section and are open at both ends.

In the embodiment shown in the drawing, the lower half of the chamber 6 is filled with the material 8 with the open honeycomb structure in order to absorb the first pressure wave. The second half of the chamber situated above this is filled with an open-pore foam 7 that absorbs the attenuated pressure wave.

The foam and/or of the material 8 with the honeycomb structure is composed of plastic, glass, or ceramic. The outer diameter of the honeycombs/tubes is 2-10 mm. Preferably, the foam 7 is fastened directly to the cover 2 and in particular, is an integral component of the cover.

In the proposal according to the invention, the elasticity of the inserted materials 7, 8, plays no role. Due to the open-pore structure of the materials and due to explosion of the gases into the pores, compressibility, in response to an explosion wave, is low.

The teachings according to the invention yield the following effects and advantages:

A free vertical mobility of the electrolyte in the lower region of the battery through a vertically oriented honeycomb structure or open-pore foam with large pores and connecting regions, so that the electrolyte and the gas are able to move virtually unhindered in the vertical direction and do not remain in the foam due to capillary action. The pressure wave is diverted laterally through the walls of the pores and honeycombs so often that the pressure wave does not strike the outer wall suddenly but rather in a chronologically "blurred" fashion. Toward the bottom, the electrolyte column constitutes an elastic element that absorbs the chronologically blurred pressure wave and disperses it spatially.

An open pore structure in the upper region of the cell, so that gas can be absorbed and if necessary, electrolyte as well. When very powerful overcharging occurs, the electrolyte is composed of a liquid/gas mixture. The open-pore foam absorbs the gas. In addition, if the pores are sufficiently large, electrolyte can also be absorbed. The open-pore foam and/or the honeycomb structure achieve the fact that the reduction of the free gas volume and the pressure increase produced by powerful overcharging do not cause electrolyte to escape from the cells. The open-pore foam, if its pores are very small, makes it impossible for gas to explode inside the pores and, at the same time, provides additional spatial and chronological dispersion of the pressure wave from the lower region, so that the cover 2 is subjected to only slight mechanical strain. If a larger pore structure is required due to the absorption of the electrolyte/gas mixture, then the principle that the pores divide the explosion region and blur the pressure wave plays a role here as well.

An important feature for the production process is the fact that the free gas chamber 6 is divided by two materials, which can be installed separately in the plane between the case and the cover. In this way, the production process of the battery can remain virtually unchanged. It is clearly useful for the free space produced by the installation to be kept as small as possible. A height of approx. 1 mm after completion of the battery is easy to achieve, from a production standpoint.

To control the electrolyte and to facilitate the filling with electrolyte in production, it is possible to provide a compartmentalization in the region of the cover 2. The gas column situated there cannot be reduced further. The threads of the plugs, however, provide a particular degree of reinforcement to this region of the cover.

The lower installed components can also provide a mechanical fixing of the electrodes 9. This is a relevant option for batteries subjected to mechanical strain (construction machines, etc.).

Through the embodiment of the lower installed component 8, it is also possible to achieve the fact that rising gas is subjected to a different flow resistance. If the flow resistance is increased by means of small openings in the outer region, this initiates a downward movement of the electrolyte in the outer region. This reduces the risk of acid stratification.

The invention claimed is:

1. A rechargeable battery having a housing (1) with at least one sidewall and a top cover (2), the housing enclosing a plurality of cells (4) and respective electrodes, the housing and cover (2) together defining a chamber (6) that is situated above the electrodes and is closed by the battery cover (2), wherein
    the chamber (6) has a bottom formed by respective upper surfaces of the electrodes, a horizontal layer of material (8) with a honeycomb structure is placed at the bottom of the chamber (6),
    a horizontal layer of open-pore foam (7) is placed above said layer of material (8) with a honeycomb structure,
    wherein said honeycomb structure includes a plurality of small tubes, each having two open ends, said tubes extending parallel to each other; and
    wherein the tubes composing the honeycomb structure are arranged with their longitudinal axes oriented vertically.

2. The battery of claim 1, wherein the material having a honeycomb structure is composed of plastic.

3. The battery of claim 1, wherein the material having a honeycomb structure is composed of glass.

4. The battery of claim 1, wherein the material having a honeycomb structure is composed of ceramic.

5. The battery of claim 1, wherein said foam (7) and said material (8) having a honeycomb structure are separate components.

6. The battery of claim 1, wherein said foam (7) and said cover (2) are formed integrally with each other.

7. A rechargeable battery having a housing (1) with at least one sidewall and a top cover (2), the housing enclosing a plurality of cells (4) and respective electrodes, the housing and cover (2) together defining a chamber (6) that is situated above the electrodes and is closed by the battery cover (2), wherein
    the chamber (6) above the electrodes is partially filled with material having a honeycomb structure and at least partially filled by an open-pore foam (7);
    said honeycomb structure comprises a plurality of small tubes, each having two open ends, said tubes extending parallel to each other, with one of said open ends being adjacent the electrodes; and
    the tubes composing the honeycombs are arranged with their longitudinal axes oriented vertically.

8. The battery of claim 7, wherein the open-pore foam (7) is composed of plastic.

9. The battery of claim 1, wherein the open-pore foam (7) is composed of glass.

10. The battery of claim 1, wherein the open-pore foam (7) is composed of ceramic.

* * * * *